Feb. 9, 1971 S. A. OSTRAGER 3,561,128
CHANNELLED SPIRIT LEVEL HAVING SPIRIT VIALS ADJUSTABLY
MOUNTED WITHIN THE CHANNEL THEREOF
Filed June 30, 1969 2 Sheets-Sheet 1

INVENTOR
SEYMOUR A. OSTRAGER
BY
Howard E. Thompson Jr.
ATTORNEY

Feb. 9, 1971 S. A. OSTRAGER 3,561,128
CHANNELLED SPIRIT LEVEL HAVING SPIRIT VIALS ADJUSTABLY
MOUNTED WITHIN THE CHANNEL THEREOF
Filed June 30, 1969 2 Sheets-Sheet 2
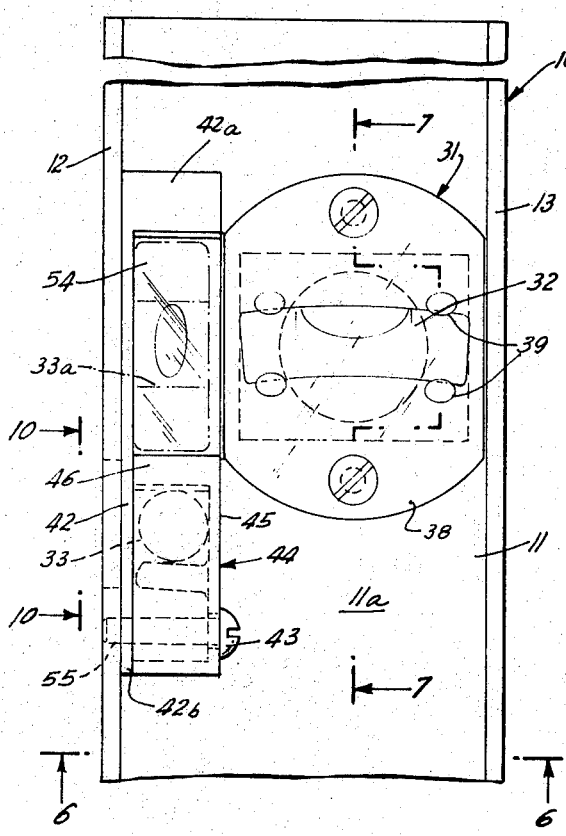
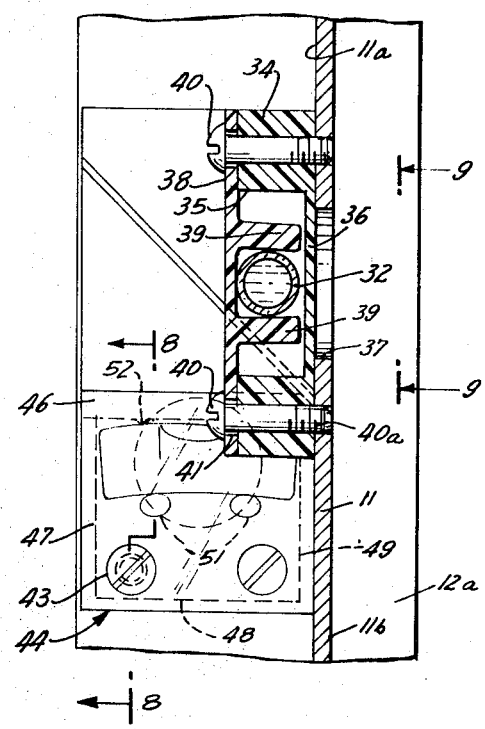
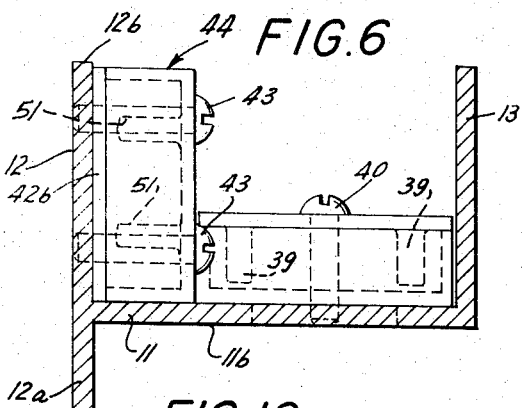
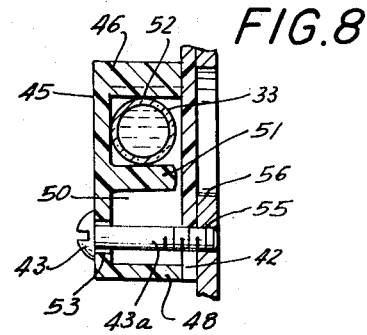
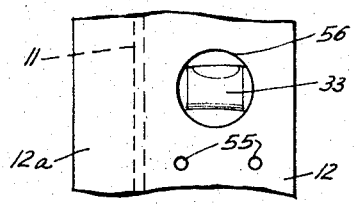
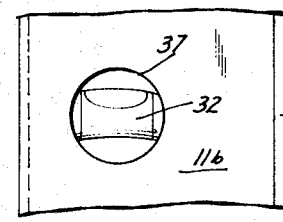
INVENTOR
SEYMOUR A. OSTRAGER
BY
ATTORNEY

United States Patent Office 3,561,128
Patented Feb. 9, 1971

3,561,128
CHANNELED SPIRIT LEVEL HAVING SPIRIT VIALS ADJUSTABLY MOUNTED WITHIN THE CHANNEL THEREOF
Seymour A. Ostrager, Bronx, N.Y., assignor to Miracle Instrument Co., New York, N.Y., a corporation of Delaware
Filed June 30, 1969, Ser. No. 837,467
Int. Cl. G01c 9/28
U.S. Cl. 33—213      12 Claims

ABSTRACT OF THE DISCLOSURE

In a spirit level comprising an elongated channeled frame defined by a web and parallel side walls extending perpendicularly from one surface of said web, with one of said side walls extending beyond said web to provide a flange disposed perpendicularly to the opposed side of said web, means is provided for adjustably mounting spirit vials in connection with said web in a manner to be completely housed within the channel of said frame. The mounting means includes a base member of transparent plastic material detachably secured to the web portion of the frame and having a spirit vial receiving recess in the outer face thereof, and a transparent plastic cover member overlying said base member having resilient means for firmly supporting a spirit vial in connection therewith in a manner to be positioned in said recess and spaced from said base member. The cover member is detachably secured to said base member in a manner to provide limited rotation of the cover member for accurate alignment of the spirit vial. In one special adaptation of the invention a second spirit vial is mounted within the recess of said base member by resilient means securing the same to said base member and adjustably by limited rotation of the base member. In another special adaptation a second vial is adjustably mounted on an extension along one side of the base member and oriented perpendicularly to said web, and said extension supports an angled mirror so positioned that the first vial and the mirror image of said second vial are in substantial alignment.

---

This invention relates to a novel means for adjustably mounting spirit vials within the channel portion of a spirit level frame defined by a web, parallel side walls extending perpendicularly from one surface of said web, with one of said side walls extending beyond said web to provide a flange disposed perpendicularly to the opposed side of said web. A spirit level frame of this structure is highly desirable from the standpoint of low cost and durability as the entire frame can be extruded from aluminum or other metals in a manner to provide true surfaces and angles such as are essential in a spirit level. Furthermore, such a channelled frame combines a compactness with versatility in use, since the flange extension of one of the channel sides in conjunction with the reverse side of the web permits engagement of the spirit level with vertical corners of structural parts, so that with proper orientation of spirit vials in connection with the frame simultaneous plumb readings in two planes can be obtained.

Spirit levels have previously been devised which permit such simultaneous plumb readings in two planes as, evidenced, for example, by Dossie et al U.S. Pat. No. 2,727,314, but in this patent the spirit vials are mounted within the boundaries of a solid and bulky spirit level body which possesses none of the advantages inherent in the use of an extruded metal spirit level frame. In the Dossie et al patent, the spirit vials are fixedly mounted in the spirit level body in the initial manufacture thereof, an operation involving considerable skill and care and inherently adding to the cost of such a device. Furthermore, to permanently mount spirit level vials in connection with a spirit level frame in the form of an extruded metal channelled member of the type described would involve steps even more intricate than those confronted in the Dossie et al construction.

In any spirit level device it is desirable to have pairs of spirit vials adapted for viewing perpendicularly to the surface or web of the device and permitting the device to be utilized selectively in a first position and in a second position representing 180° of rotation with respect to said first position. A means for mounting such pairs of spirit vials in connection with a channelled spirit level frame has been disclosed in Ziemann U.S. Pat. No. 2,810,206, but in the Ziemann patent the mounting means is associated with a double channelled spirit level frame with the separate vial supporting means disposed at opposed surfaces of a connecting web of said frame. The vial mounting means disclosed by Ziemann is entirely unsuited for use in connection with a spirit level frame of the type herein described, wherein one surface only of the web portion of the frame is within the channel of said frame and the opposed surface of the web must bo kept free of obstruction for engagement with workpiece surfaces.

The spirit vial mounting means of the present invention, which constitutes a distinct departure from anything suggested in the Dossie et al and Ziemann patents above mentioned, involves basically the use of a transparent plastic base member detachably secured to the inner surface of the web of a spirit level frame having a spirit vial receiving recess in the outer face thereof, a cover member overlying said recess having resilient means for positioning a spirit vial thereon in a manner to fit within said recess and be spaced from said base member, with the cover member having limited rotary adjustment in its plane, such as to permit accurate alignment of the spirit vial with a workpiece engaging surface of the spirit level frame.

When a pair of essentially parallel spirit vials are desired functioning with respect to a first position and a second position rotated 180° with respect thereto, a second vial can be supported by resilient means on the base member firmly supporting said vial within said recess and in spaced relation to the cover member. In such event, the mounting of the base member with respect to said web is such as to permit limited rotary movement in its plane, such that the second spirit vial can be accurately oriented with respect to a workpiece engaging surface; such adjustable mounting being in addition to the adjustable mounting of the cover member with respect to said base member.

When it is desired that spirit vials be arranged in perpendicularly disposed planes, the base member is provided at one side thereof with a perpendicularly disposed extension having adjustably secured thereto a spirit vial housing of transparent plastic material firmly supporting a spirit vial with the axis thereof substantially perpendicular to said web of the spirit level frame, and means is included in said extension for supporting a mirror at an angle of about 45° to said vial and positioned such that, when viewed perpendicularly to said web, the spirit vial in said base member and the mirror image of said second spirit vial are in substantial alignment.

Novel features of the spirit vial mounting means for channelled spirit level frames in accordance with the present invention will be more readily apparent from a consideration of the following description, together with the accompanying drawing in which preferred adaptations and structural details are illustrated with the various parts thereof identified by suitable reference characters in the several views, and in which:

FIG. 5 is an enlarged view of one end of the spirit level assemblage as shown in FIG. 1, and more precisely the lefthand end of the assemblage as seen in FIG. 1.

FIG. 6 is a view through the assemblage substantially on the line 6—6 of FIG. 5 and indicating in the background the orientation of parts.

FIG. 7 is a sectional view substantially on the broken line 7—7 of FIG. 5 and indicating in the background the orientation of parts.

FIG. 8 is a sectional view substantially on the broken line 8—8 of FIG. 7.

FIG. 9 is a fragmentary view looking in the direction of the arrows 9—9 of FIG. 7; and FIG. 10 is a fragmentary view looking in the direction of the arrows 10—10 of FIG. 5.

Figure 1:
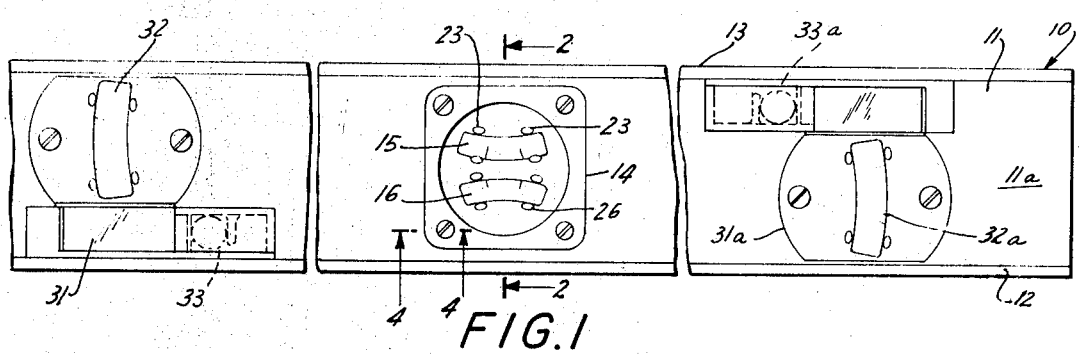
FIG. 1 is a broken and shortened view of a channelled spirit level frame as seen from the open channelled face thereof and indicating one form of spirit vial mounting at the central portion and another form of spirit vial mounting at the end portions thereof.

As shown in the drawing, a spirit level frame 10 comprises a web 11 having parallel side walls 12 and 13 extending perpendicularly from an inner surface 11a at opposed edges of said web. One of the side walls 12 has a continuation or extension 12a protruding beyond the outer face 11b of said web and forming a flange disposed perpendicularly to the surface 11b.

Arranged within the channel of the frame 11 and bearing against the inner surface 11a of said web there is shown centrally of FIG. 1 a mounting unit 14 for a pair of essentially coplanar spirit vials 15, 16, the vial 16 being oriented to gauge the level of a horizontal workpiece contacted by the outer surface of the side wall 12 and the vial 15 being oriented 180° from the vial 16 to gauge the level of a horizontal workpiece contacted by the outer surface of the flange 13. It will, of course, be understood that the mounting unit 14, instead of being arranged longitudinally of the frame 10, could be arranged transversely thereof, in which event the vial 16 would gauge the plumb of vertical workpieces contacted by the flanges 12 and 13 in one vertical position of the frame 10 and the vial 15 would gauge the plumb of such vertical workpieces if the frame 10 were inverted to the reverse vertical orientation.

Figures 2, 3:
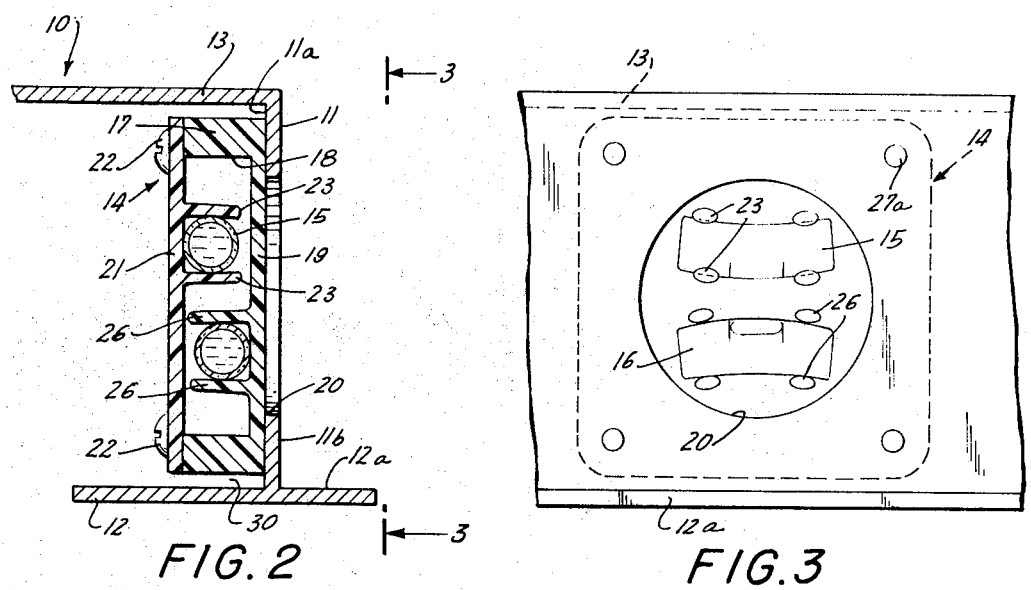
FIG. 2 is an enlarged sectional view substantially on the line 2—2 of FIG. 1.
FIG. 3 is a fragmentary view of the reverse side of the assemblage looking in the direction of the arrows 3—3 of FIG. 2.
Figure 4:
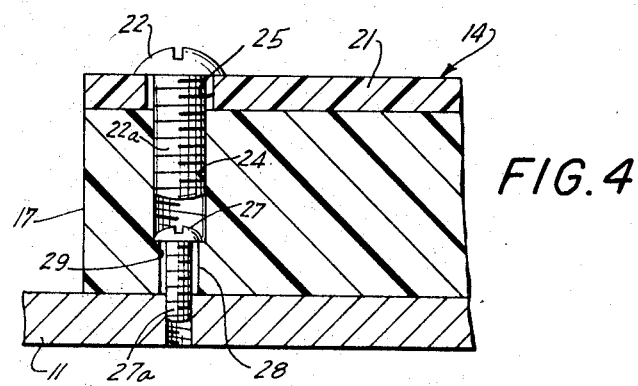
FIG. 4 is an enlarged sectional view substantially on the line 4—4 of FIG. 1.

As more clearly shown in FIGS. 2 to 4 of the drawing, the mounting unit 14 comprises a base member 17 having an enlarged vial receiving recess 18 in the face thereof remote from the web 11. The base member is preferably fashioned from clear plastic material with the panel 19 at the bottom of the recess 18 forming, in effect, a window overlying an aperture 20 in the web 11 aligned with the recess 18. A cover member 21 engages the outer face of the base member 17 overlying the recess 18 and being secured to the base member by a plurality of adjustable fastening devices or screws 22. The cover member 21 is also preferably fashioned from transparent plastic material permitting free viewing to the interior of the recess 18 and through the window 19 and aperture 20. The inner surface of the cover member 21 has resilient means, as indicated by the spaced pairs of inwardly extending prongs 23, for firmly engaging the vial 15 and rigidly supporting the same against the inner face of the cover member 21. The prongs 23 in each pair are preferably somewhat convergent in the direction of the free ends thereof so that the supported vial 15 has, in effert, a three point support by its engagement with inner opposed surfaces of the prongs 23 and the inner surface of the cover member 21.

The prongs 23 terminate short of the wall or window 19 of the base member and support the vial 15 in slightly spaced relation to the window 19. In other words, the vial as supported by the cover member 21 does not directly engage or contact the base member 17. While the clamping engagement provided by the prongs 23 is normally sufficient to fixedly position the vial 15 on the cover member 21, it is within the scope of the invention to add small amounts of adhesive between the prongs 23 and the vial 15 to further assure the fixed positioning of the vial 15 with respect to the cover member 21.

As shown in FIG. 4 of the drawing, the screws 22 which engage threaded bores 24 in the base member 17 pass through apertures 25 in the cover member 21, which are substantially larger than the shank portions 22a of the screws 22. This clearance between the apertures 25 and the shank portions 22a is sufficient to provide a limited rotary adjustment of the member 21 within its plane when the screws 22 are loosened, such that the orientation of the spirit vial 15 may be accurately adjusted with respect to a particular workpiece engaging surface of the spirit level, in this instance the outer surface of the side wall 13.

If it is desired that a second spirit vial 16 be mounted within the recess 18, resilient means is provided integral with the base member 17, as indicated by the convergent prongs 26 protruding from the wall or window 19, such prongs 26 functioning as previously described with respect to the prongs 23 for firmly supporting the spirit vial 16 in engagement with the wall or window 19 and spaced from the cover member 21.

The second spirit vial 16, as shown in the drawing, must be accurately oriented with respect to the workpiece engaging surface provided by the outer face of the side wall 12. This adjustment is provided by adjustable fasteners or screws 27 having threaded engagement with the web 11 passing through apertures 28 in the base member 17 which are substantially larger than the shanks 27a of the screws 27. The clearance between the apertures 28 and screw shanks 27a provides, when the screws are loosened, for sufficient rotary movement of the base member 17 within its plane to permit accurate alignment of the spirit vial 16 with respect to the outer surface of the side wall 12, 12a of the frame.

For compactness and symmetry in the mounting member 14, the fastening members or screws 22 and 27 can be disposed within a common bore through the base member 17, as clearly shown in FIG. 4 of the drawing, wherein the threaded bores 24 are of sufficient size to receive the heads of the screws 27 and are countersunk somewhat more than halfway through the base member 17 to register with the coaxial apertures 28 which are of reduced diameter providing annular bearings 29 for engagement by the heads of the screws 27. With this arrangement, accurate alignment of spirit vial 16 by means of the screws 27 is first effected and then the screws 22 are attached and drawn tight after the alignment of the vial 15 has been accurately adjusted.

Since limited rotary movement of both the base member 17 and the cover member 21 is required when making the accurate alignments of the vials 16 and 11 respectively, it is important that there be substantial clearance, as indicated at 30 in FIG. 2 of the drawing, between the mounting unit 14 and the inner surfaces of the side walls 12 and 13. Furthermore, since the mounting unit 14 can at times be arranged with the spirit vials perpendicular to the side walls 12 and 13 as earlier described, a similar clearance 30 must be provided when the mounting unit 14 is thus oriented transversely of the channelled frame. In other words, the mounting unit 14 is preferably of essentially square overall contour, and with such a square contour it becomes apparent that the coaxial arrangement of the fastening elements or screws 22, 27 is of special practical significance.

At opposed end portions of the frame 10 as shown in FIG. 1 of the drawing are illustrated similar vial mounting units 31, 31a, each having a spirit vial 32, 32a disposed transversely of the frame and a second spirit vial 33, 33a disposed perpendicularly to the web 11 of said frame and offset with respect to the vials 32, 32a in a direction inwardly with respect to the associated ends of the frame 10.

Details of the vial supporting units 31, 31a are more clearly illustrated in FIGS. 5 to 10 of the drawing, these figures being based on the vial mounting unit 31, wherein the second spirit vial 33 is disposed adjacent the side wall 12 of the frame. The vial mounting unit 31 comprises a base member 34 which bears against the inner surface 11a of the web and which has a vial receiving recess 35 in the outer face thereof. The base member 34 is suitably fashioned from transparent plastic material and the bottom wall of the recess 35 provides a window 36 which, in conjunction with an aligned aperture 37 in the web 11, permits viewing through the web 11 into the vial recess 35.

Overlying the mounting member 34 and the recess 35 therein is a cover member 38 also suitably formed of transparent plastic material having resilient means as indicated by the spaced pairs of convergent fingers 39 for firmly supporting the spirit vial 32 in engagement therewith and with the inner face of the cover member 38. It will be noted that the fingers 39 terminate short of the wall or window 36 and support the vial 32 in slightly spaced relation to the wall or window 36.

As shown in the drawing, the spirit vial 32 is intended to provide plumb readings with respect to vertical workpieces contacted by outer surfaces of the side walls 12 or 13 of the spirit level frame; and means is provided for accurately orienting the spirit vial 32 with respect to such surfaces as indicated by the fastener elements or screws 40 having threaded engagement with the base member 34 and web 11 and apertures 41 in the cover member 38 which are somewhat larger than the shanks 40a of said screws. The clearance between the screw shanks 40a and the larger apertures 41 provides sufficient rotary movement of the cover member 38 within its plane to permit accurate alignment of the spirit vial 32 with respect to the side walls 12 and 13. Integral with the base member 34 and disposed along one side thereof perpendicularly to the axis of the spirit vial 32 is an elongated extension 42 adapted to bear against the inner surface of the side wall 12 and to contact the same from the vicinity of the web 11 to a point slightly inside the outer edge 12b of the side wall 12. One end 42a of the extension 42 is in substantial alignment with an edge of the mounting member 34, as clearly shown in FIGS. 5 and 7, while the other end 42b of the extension protrudes substantially beyond the corresponding end of the mounting member 34. Secured to the protruding end 42b by detachable fasteners or screws 43 is an adjustable vial housing and support member 44 having an outer wall 45 generally parallel to the extension end 42b and periperal side walls 46, 47, 48, 49 which bear against the extension end 42b to provide an enclosed vial receiving recess or chamber 50. A pair of spaced resilient prongs 51 cooperating with aligned protrusions 52 on the wall 46 provide for the firm support of the spirit vial 33 within the chamber 50 in engagement with the wall 45 and in spaced relation to the end extension 42b. As seen in FIG. 8 of the drawing, the screws 43 pass through apertures 53 in the wall 45 which are substantially larger than the screw shanks 43a providing limited rotary adjustment of the wall 45 in its plane such as to permit accurate orientation of the spirit vial 33 with respect to its associated workpiece engaging surface which, in this instance, is the outer surface 11b of the web.

The end portion 42a of the side extension is substantially thicker than the end extension 42b, as seen in FIG. 5 of the drawing, and provides means for supporting a mirror 54 at an angle of about 45° with respect to the spirit vial 33 and so positioned that the spiral vial 32 and the mirror image 33a of the spirit vial 33 are in substantial alignment when viewed perpendicularly to the web 11, as seen in FIG. 5 of the drawing.

The fastening devices or screws 43 preferably enter and have threaded engagement with apertures 55 in the side wall 12, and the side wall is further provided with an enlarged aperture 56 aligned with the spirit vial 33 to permit viewing of the spirit vial 53 if desired through said side wall.

In the drawing the various fastening devices or screws have been shown, for illustrative purposes, as having slotted ends for engagement with a conventional screwdriver. It will be understood, of course, that any conventional type of interengagement between fastener elements and adusting means can be provided including without limitation recessed devices for engagement with "Phillips"-type screwdrivers or "Allen"-type wrenches, the latter being somewhat preferable to the conventional slotted screws as a means for minimizing the chance of tampering with a properly adjusted spirit level assemblage.

The individual adjustment which is provided for each of the spirit vials in the various adaptations of the invention is considered to be of primary advantage in the initial production of spirit level assemblages because it provides a means whereby relatively unskilled personnel without the need for special or intricate equipment can accurately align and anchor in place the several spirit vials. The construction provides the further advantage that the user can re-align one or more of the spirit vials if they should be inadvertently knocked out of alignment by rough handling of the spirit level assemblage. It is within the scope of the invention, however, that the feature of adjustability be utilized primarily in the initial assembly operations and that the fastening devices or screws be supplemented by small deposits of adhesive at suitable locations so that the several spirit vials are permanently mounted by the time the assemblage reaches the ultimate consumer.

It will also be appreciated that the various transparent plastic parts as shown in the drawing are capable of being produced by plastic molding operations requiring a minimum of supplemental tooling in order to permit their full assemblage. This serves to hold the cost to a minimum and, coupled with the economies provided by the ease of assemblage as above described, it will be apparent that the spirit vial supporting structures of the present invention lend new practicability to the use of extruded metal spirit level frames.

Various changes and modifications in the vial supporting means for spirit levels as herein disclosed will occur to those skilled in the art and to the extent that such changes and modifications are embraced by the appended claims it is to be understood that they constitute part of the present invention.

I claim:

1. In a spirit level having an elongated channelled frame formed by a planar web, parallel side walls extending perpendicularly form opposed edges of one inner surface of said web, one of said side walls continuing as an extension beyond the other outer surface of said web with the inner surface thereof disposed perpendicularly to said outer surface of the web, such that outer surfaces of both side walls, the inner surface of said flange extension and the outer surface of said web constitute workpiece engaging surfaces in varied uses of said level, spirit vial mounting means detachably secured to the inner surface of said web, said mounting means protruding from said web a distance less than the width of said side walls and comprising a base member of transparent plastic material directly abutting against said web and having a vial receiving recess in the outer surface thereof, and a cover member also of transparent plastic material overlying said base member and disposed parallel to said web, resilient means protruding from the inner surface of said cover member for firmly supporting a spirit vial on said cover member, the vial supported on said cover member fitting within the recess of said base member and being spaced from a bottom wall of said recess, and means for detachably securing said cover member to said base member, said last named means providing limited rotary movement of said cover member within its plane, such as to permit accurate alignment of said spirit vial with respect to at least one of said workpiece engaging surfaces.

2. Spirit vial mounting means as defined in claim 1, wherein said vial is disposed transversely of said web.

3. Spirit vial mounting means as defined in claim 1, wherein said vial is disposed longitudinally of said web.

4. Spirit vial mounting means as defined in claim 1, wherein said base member includes resilient means within the recess thereof for firmly supporting a second spirit vial on said base member and in spaced relation to said cover member, and said base member being detachably secured to said web through means providing limited rotary movement of said base member within its plane, such as to permit accurate alignment of said spirit vial with respect to at least one of said workpiece engaging surfaces.

5. Spirit vial mounting means as defined in calim 4, wherein said last named means comprises a plurality of screws extending through loose fitting apertures in said base and having threaded engagement with said web.

6. Spirit vial mounting means as defined in claim 5, wherein said screws are countersunk in threaded recesses in said base member, and other screws engaging said threaded recesses provide said means for detachably securing the cover member to said base member.

7. Spirit vial mounting means as defined in claim 1, wherein said base member includes an extension at one side thereof disposed perpendicularly to said base member and to a spirit vial arranged in the recess thereof, means for supporting a second spirit vial on said extension disposed perpendicularly to the plane of said web, and means supporting a mirror in alignment with said second vial and at an angle of about 45° with respect thereto, such that when viewed from the open side of said channelled frame the image of said second vial in said mirror is in substantial alignment with the first named vial, permitting simultaneous viewing of both spirit vials.

8. Spirit vial mounting means as defined in claim 7, wherein said extension is disposed along a side wall of said channelled frame and is secured to said side wall.

9. Spirit vial mounting means as defined in claim 7, wherein said extension is disposed along a side wall of said channelled frame and is secured to said side wall by screws which also provide adjustable support means for said second spirit vial.

10. Spirit vial mounting means as defined in claim 7, wherein the means for supporting said second spirit vial comprises a transparent plastic housing having a vial receiving recess adapted to bear against said extension, and resilient means within said recess for firmly mounting said vial within said recess and spaced from said extension.

11. Spirit vial mounting means as defined in claim 10, wherein said housing is adjustably secured to said extension by means of screws passing through enlarged apertures in said housing and having threaded engagement with said extension.

12. Spirit vial mounting means as defined in claim 11, wherein said screws pass through said extension and have threaded engagement with a side wall of said channelled frame.

References Cited
UNITED STATES PATENTS

| | | | |
|---|---|---|---|
| 1,435,365 | 11/1922 | Zieman | 33—213 |
| 1,784,550 | 12/1930 | Sinner et al. | 33—207 |
| 2,635,350 | 4/1953 | Bettega | 33—211 |
| 2,727,314 | 12/1955 | Dossie et al. | 33—211 |
| 3,159,924 | 12/1964 | Lieblein | 33—207 |
| 3,190,010 | 6/1965 | Johnson | 33—211 |

LEONARD FORMAN, Primary Examiner

C. E. PHILLIPS, Assistant Examiner

U.S. Cl. X.R.

33—207